United States Patent [19]

Rotermund et al.

[11] Patent Number: 5,965,231
[45] Date of Patent: Oct. 12, 1999

[54] GAS MIXTURES FOR THERMAL INSULATION

[75] Inventors: Udo Rotermund, Ortrand; Anne-Kathrin Merten, Lauchhammer; Norbert Krollmann, Bissersheim, all of Germany

[73] Assignee: BASF Aktiengesellschaft, Ludwigshafen, Germany

[21] Appl. No.: 09/044,476

[22] Filed: Mar. 19, 1998

[51] Int. Cl.$^6$ ................................ B32B 1/06; C09K 3/00
[52] U.S. Cl. ............................ 428/69; 428/71; 428/305.5; 252/372
[58] Field of Search ............................ 428/71, 69, 305.5; 252/372; 52/309.6

[56] References Cited

U.S. PATENT DOCUMENTS 5,182,309 1/1993 Hützen ........................................ 521/99
5,269,987 12/1993 Reedy ........................................ 264/50
5,530,032 6/1996 Wayand ...................................... 521/51

FOREIGN PATENT DOCUMENTS 0 394 769 A1  4/1990  European Pat. Off. .
42 20 998 C1  6/1992  Germany .

OTHER PUBLICATIONS

Fluid Phase Equilibria 5012 (1989) pp. 223–233, M.A. Gallardo, M.C. Lopez, J.S. Urieta and C. Gutierres Losa, Elsevier Science Publishers B.V. Amsterdam.

*Primary Examiner*—Alexander Thomas
*Attorney, Agent, or Firm*—Fernando A. Borrego; James J. Drake

[57] ABSTRACT

The present invention relates to thermal insulation gas mixtures comprising cyclopentane and argon for filling cavities.

18 Claims, No Drawings

GAS MIXTURES FOR THERMAL INSULATION

DESCRIPTION

The present invention relates to gas mixtures of low thermal conductivity which can be used for thermal insulation.

Gases have a significantly lower thermal conductivity than liquids or solids. This property of gases has been utilized for a very long time for thermal insulation, the aim in particular being to eliminate gas convection as a further mechanism of heat transport.

Thus, for example, the thermal insulation action of feathers and down or of cork is attributable, in particular, to the low thermal conductivity of the air, whose convection in these porous materials is virtually zero.

The reduced thermal transmission of double- or multiple-glazed windows compared with single-glazed windows, which is disclosed, for example, in physics books, eg. Physik, Schwingungen und Wellen, Wärmelehre, VEB Verlag Technik, Berlin 1961, by A. Recknagel, 4th Edition, page 162, is also based, inter alia, on the low thermal conductivity of air under conditions of restricted convection.

It is furthermore known that a number of gases have a significantly lower thermal conductivity than air and are therefore more suitable than air for filling cavities for the purposes of thermal insulation.

Instead of air, which has a thermal conductivity of 26 mW/mK, it is therefore also possible to use, in a known manner, other gases of lower thermal conductivity, for example argon, with a thermal conductivity of 17 mW/mK, or $CO_2$, with a thermal conductivity of 16 mW/mK, in each case at 25° C. (The values given below for the gas thermal conductivity are taken from the book The Properties of Gases and Liquids by Robert C. Reid, John M. Prausnitz and Thomas K. Sherwood, McGraw-Hill Book Company, Third Edition, 1977, Chapter 10, Nomogram FIG. 10-8, Table 10-4, and Table 10-5). Thus, for example, the cavities of double- or multiple-glazed windows can also be filled with argon or $CO_2$, giving better thermal insulation than air. If it is not desired to have a clear view through the window, but instead a milky glass effect, the cavity between the panes can also be filled with a fine-pore translucent material, for example an aerogel based on silica or organic substances. This filling further improves the thermal insulation capacity. Irrespective of whether the cavity is filled or not, replacing air as filling gas with a gas of lower thermal conductivity improves the thermal insulation.

Cavities having porous fillings have the principal advantage over cavities filled merely with gas that they also greatly impair radiative heat transport, the additional increase in thermal conductivity via the solid material of the porous filler being significantly less than the reduction in radiative thermal conductivity.

An important special case here are closed-cell foams, for example closed-cell rigid polyurethane foams or closed-cell polystyrene foams. The gases are employed as blowing agent and then remain in the closed cells and exert their thermal insulating action. However, it is in principle also possible subsequently to fill open-cell foams with the desired gas and to provide the foam with a gas-impermeable covering. The important factor in the case of foams is no longer optical transparency, but only thermal insulation.

It is also known to evacuate the cavity in order to exclude thermal transport by heat conduction and convection. In this case, however, relatively low pressures in the KNUDSEN range below 1 mbar are necessary, according to the monograph The Properties of Gases and Liquids by Robert C. Reid, John M. Prausnitz and Thomas K. Sherwood, McGraw-Hill Book Company, Third Edition, 1977, page 499, in order to achieve the vacuum effect described. The supporting action of glass panes of relatively large surface area is totally inadequate to withstand the external atmospheric pressure if the cavity is evacuated to such an extent that use in the windows sector is excluded from the very beginning. Although a porous filling can absorb these forces, it impairs the optical transparency. In addition, the relatively high vacuum means considerably greater complexity compared with a simple gas filling.

The evacuation of open-cell rigid foams and vacuum-tight sealing thereof with special gas-tight films has also frequently been described recently (vacuum insulation panel (VIP), for example in Proceedings of Polyurethanes EXPO '96, Las Vegas, Nev., Oct. 20–23, 1996, p. 35–42). It is also apparent that the complexity of the vacuum method below 1 mbar is greater than the simple filling of the open-cell foams with gases or gas mixtures at higher pressures, preferably at atmospheric pressure. Compared with argon or $CO_2$, chlorofluorocarbons (CFCs), for example, are even better regarding thermal insulation. For example, trichlorofluoromethane (known as R 11, which is used as representative of CFCs below) has a thermal conductivity of only 7.8 mW/mK.

However, CFCs have a very high ozone depletion potential (ODP) of 100% and in addition contribute considerably to the greenhouse effect (Global Warming Potential (GWP) of R 11 likewise 100%). Although the use of hydrogen-containing chlorofluorocarbon compounds (HCFCs) results in reduced ODP and GWP values, these values are still not acceptable. For this reason, the use of CFCs has been banned in Germany since 1994, and use of HCFCs will be banned shortly.

Although chlorine-free hydrogen-containing fluorocarbon compounds (HFCs) have an ODP value of zero, they still have a significant GWP value. In addition, these substances are very expensive and, once in the atmosphere, can generate acidic and environmentally harmful decomposition products, in particular hydrogen fluoride, as evident, for example, from the Proceedings of Polyurethanes EXPO '96, Las Vegas, Nev., Oct. 20–23, 1996, p. 394–403. The use of sulfur hexafluoride as gas filling also results in low thermal conductivities. However, this substance also has a very high GWP value and its use will therefore soon be banned.

Use of heavy noble gases, such as krypton or xenon, having very low thermal conductivities, would solve the problem in an elegant manner, but would result in unacceptably high costs. The use of new thermal insulation gases having an ODP value of zero and a negligible GWP value has recently been proposed, principally in the area of rigid polyurethane foams. Production of isocyanate-based rigid foams as thermal insulation material has been known for some time. The most important chemical starting materials are polyfunctional isocyanates. As chemical structures formed from these polyisocyanates, mention may be made here of polyurethanes, polyureas, polyisocyanurates and also further isocyanate adducts, such as allophanates, biurets, carbodiimides and isocyanate adducts thereof, oxazolidones, polyimides, polyamides, inter alia. The type of these structures is controlled by the isocyanate reaction partners, the catalysis and the reaction conditions. These isocyanate adducts are generally known by the collective term polyurethanes, since the polyurethanes are the most important and common group of substances from amongst the polyisocyanate adducts. The preparation of rigid polyurethane foams defined in this way is described, for example, in Kunststoff-Handbuch, Volume VII, Polyurethane, edited by R. Vieweg and A. Höchtlen, Carl Hanser Verlag, Munich, 1966, and in Kunststoff-Handbuch, Volume VII, Polyurethane, edited by G. Oertel, Hanser Verlag, Munich, Vienna, 1993.

The problem of conversion from CFCs has been solved for many areas of application of rigid polyurethane foams by using hydrocarbons mixed with $CO_2$ or $CO_2$ alone as blowing gases, which are present in the foam as heat-insulating gases. Of the hydrocarbons, the simple pentanes are highly suitable owing to their relatively low gas thermal conductivity combined with a sufficiently low boiling point. The term simple pentanes here is taken to mean n-pentane, isopentane and cyclopentane. The publications by G. Heilig, Kunststoffe 81 (1991), pp. 622–625, and G. Heilig et al., Kunststoffe 81 (1991), pp. 790–794, discuss the blowing of rigid polyurethane foams using pentane. Of the imple pentanes, cyclopentane is favored in DE 3 933 335 and EP 0 421 269 owing to its low inherent thermal conductivity, but still results in a higher thermal conductivity than R 11 foams. Cyclopentane has a vapor pressure of only about 400 mbar at 25° C. and must therefore be mixed with a second gas in order to achieve an overall pressure of 1 bar. Rigid polyurethane foam technology uses $CO_2$ for this purpose, which is formed mainly by reaction between water and isocyanate.

It is an object of the present invention to provide halogen-free gas mixtures having an ODP value of zero which, when introduced into cavities, for example into cells of open- and closed-cell foams, into the interior of multiple glazing, etc., result in improved thermal insulation compared with the proposals made hitherto.

We have found that, surprisingly, this object is achieved by gas mixtures comprising cyclopentane and argon.

Accordingly, the present invention provides thermal insulation gas mixtures which comprise cyclopentane and argon.

The present invention furthermore provides cavity-containing thermal insulation materials which contain gas mixtures comprising cyclopentane and argon.

Besides cyclopentane and argon, the novel gas mixtures may also contain further gases.

Examples thereof are air, carbon dioxide, hydrocarbon vapors of methane, ethane, propane, n-butane, isobutane, n-pentane, isopentane, neopentane, hexanes, heptanes and octanes, furthermore noble gases, vapors of methyl formate, ethyl formate, acetone and methylal, in particular air, carbon dioxide and hydrocarbon vapors.

Particularly suitable gas mixtures are those which comprise at least 40% by volume of cyclopentane and argon and at most 60% by volume of other gases. The ratio by volume between cyclopentane and argon is preferably from 1:99 to 95:5, particularly preferably from 10:90 to 25:75, in particular from 35:65 to 65:35. In this range, very high thermal insulation occurs, which cannot be explained by the known ideas of thermal insulation.

A particularly strong insulating action can be achieved if the novel gas mixtures are introduced, in a manner known per se, into foams or other cavities, for example multiple glazing. The novel gas mixtures can be introduced into cavities, for example, by evacuating the cavities and breaking the vacuum by means of the gas mixtures. The cavities filled with the gas mixtures are then sealed in a gas-tight manner in order to prevent the gases diffusing out. In multiple glazing, this sealing can be achieved by suitable sealants.

In the case of porous solids, in particular open-cell rigid foams, the sealing is carried out, in particular, by covering the foam by films or foils, for example made of plastic, metal, such as aluminum, or multilayer composite films or foils made from said materials.

The good thermal insulation properties of the novel gas mixtures are surprising and were not evident from the prior art. M. A. Gallardo et al., Fluid Phase Equilibria, (Oct. 15, 1989), V. 50 (1-2) p. 223–233, have studied the solubility of nonpolar gases in cyclopentanone. However, no conclusions were drawn on the thermal conductivity of mixtures of cyclopentane and argon.

The novel gas mixtures can also be used as cell gas in closed-cell foams, such as closed-cell rigid PU foams or polystyrene foams. It is also possible to provide natural insulating materials, such as cork, down or feathers, with an atmosphere of the novel gas mixture.

The invention is illustrated in greater detail with reference to the Examples below.

EXAMPLE 1 (Comparison)

An open-cell foam made from melamin resin (BASOTECT® from BASF Aktiengesellschaft, Ludwigshafen) having a density of 12 kg/M$^3$ and measuring 500×500×50 mm was covered with a polyamide film and filled with air at 1 bar. The thermal conductivity of this arrangement was determined using a heat flow meter (measuring instrument in accordance with DIN 52616) at 40° C. A value of 38.7 mW/mK was determined.

EXAMPLE 2 (Comparison)

The procedure was similar to that of Example 1, but the air was replaced by carbon dioxide. A thermal conductivity of 25.4 mW/mK was determined.

EXAMPLE 3 (Comparison)

The procedure was similar to that of Example 1, but the air was replaced by a mixture of 72.6% by volume of carbon dioxide and 27.6% by volume of cyclopentane vapor. The gas concentrations were determined by gas chromatography. A thermal conductivity of 24.0 mW/mK was determined.

With 59.2% of $CO_2$ and 40.7% of cyclopentane, a thermal conductivity of 23.1 mW/mK was determined.

EXAMPLE 4 (Comparison)

The procedure was similar to that of Example 1, but the air was replaced by argon. A thermal conductivity of 26.4 mW/mK was determined.

EXAMPLE 5

The procedure was similar to that of Example 1, but the air was replaced by a mixture of 64.5% by volume of argon and 37.3% by volume of cyclopentane vapor with an overall pressure of 1 bar. A thermal conductivity of 22.2 mW/mK was determined.

Although pure argon produced worse thermal insulation than pure carbon dioxide in the experimental apparatus, the thermal insulation action of the arrangement improved in a surprising manner in the case of a mixture of argon with cyclopentane compared with a similar mixture of cyclopentane with carbon dioxide.

EXAMPLE 6 (Comparison)

A sealed glass box of glass with an IR-reflective coating and external dimensions of 20 cm×15 cm×2 cm with 2 sealable connectors and a glass wall thickness of 5 mm was filled with air at 1 bar as a model of multiple glazing. A thermal conductivity of 64.0 mW/mK at 23° C. was measured on the arrangement.

EXAMPLE 7 (Comparison)

The procedure was similar to that of Example 6, but the air was replaced by carbon dioxide. A thermal conductivity of 46 mW/mK was determined.

EXAMPLE 8 (Comparison)

The procedure was similar to that of Example 6, but the air was replaced by argon. A thermal conductivity of 49.6 mW/mK was determined.

EXAMPLE 9 (Comparison)

The procedure was similar to that of Example 6, but the air was replaced by a mixture of 37.9% of cyclopentane vapor and 62.1% of carbon dioxide. A thermal conductivity of 41.4 mW/mK was determined.

EXAMPLE 10

The procedure was similar to that of Example 6, but the air was replaced by a mixture of 38% of cyclopentane vapor and 61.8% of argon. The thermal conductivity of 37.8 mW/mK which was determined was significantly lower than expected.

EXAMPLE 11

A sealed glass box measuring 20×15×1.67 cm with 2 sealable connectors, a glass wall thickness of 3 mm and an overall thickness of the double glass wall of 16.7 mm gave the following values at a mean temperature of 40° C. for glass with no IR-reflective coating.

| | | |
|---|---|---|
| a) | Filling with air (comparison) | 113 mW/mK |
| b) | Filling with argon (comparison) | 100 mW/mK |
| c) | Filling with carbon dioxide (comparison) | 98 mW/mK |
| d) | Filling with cyclopentane and carbon dioxide in a volume ratio of 38:62 (comparison) | 91.5 mW/mK |
| e) | Filling with cyclopentane and argon in a volume ratio of 38:62 (according to the invention) | 87.5 mW/mK |

EXAMPLE 12 (Comparison)

A rigid polyurethane foam was produced from the following constituents:

| Component A (polyol component) | |
|---|---|
| Polyol made from sorbitol, water and propylene oxide, hydroxyl number 340 mg of KOH/g | 32.6 parts by weight |
| Polyethylene glycol, hydroxyl number 190 mg of KOH/g | 10.6 parts by weight |
| Polyesterol made from dimeric fatty acid, hydroxyl number 400 mg of KOH/g | 13.1 parts by weight |
| Flame retardant mixture, based on phosphorus and chlorine | 30.5 parts by weight |
| Stabilizer mixture | 1.72 parts by weight |
| Water | 1.21 parts by weight |
| Potassium acetate | 1.22 parts by weight |
| Amine/catalyst mixture | 1.05 parts by weight |

| -continued | |
|---|---|
| Cyclopentane as blowing agent | 8.0 parts by weight |
| Total | 100.00 parts by weight |
| Component B | |
| Polyisocyanate | 200.0 parts by weight |

Component A was mixed with component B in a known manner by means of a high-pressure mixing head and introduced into a mold measuring 2000 mm×200 mm×50 mm held at 45° C. The mold-foamed density was 50 kg/m$^3$. Owing to the production method, the cell gas comprised principally cyclopentane and $CO_2$, and the polymer structure comprised both polyurethane and polyisocyanurate elements. The thermal conductivity measured immediately after foaming (storage for 1 day) was 20.2 mW/mK.

EXAMPLE 13

The rigid foam was produced as described in Example 11. Component A was additionally charged with argon through a gas charging unit at 15 bar corresponding to about 12% by volume of argon in the foam. The thermal conductivity measured immediately after foaming (storage for 1 day) was 19.5 mW/mK. The cell gas in the present foam comprised principally cyclopentane, carbon dioxide and argon.

We claim:

1. A gas mixture comprising cyclopentane and argon for filling thermal insulation cavities, comprising from 1% by volume of cyclopentane in 99% by volume of argon to 5% by volume of argon in 95% by volume of cyclopentane.

2. A gas mixture as claimed in claim 1, which comprises from 10% by volume of cyclopentane in 90% by volume of argon to 75% by volume of cyclopentane in 25% by volume of argon.

3. A gas mixture as claimed in claim 1, which comprises from 35% by volume of cyclopentane in 65% by volume of argon to 65% by volume of cyclopentane in 35% by volume of argon.

4. A gas mixture as claimed in claim 1, in the form of a mixture of greater than 40% by volume with less than 60% by volume of other gases.

5. A gas mixture as claimed in claim 1, wherein the other gases used are carbon dioxide, air, hydrocarbons having 1 to 8 carbon atoms, noble gases, methyl formate, ethyl formate, acetone or methylal.

6. A gas mixture as claimed in claim 1, wherein the other gases used are air, carbon dioxide or hydrocarbons having 1 to 8 carbon atoms.

7. A gas mixture as claimed in claim 1, whose overall pressure is from 100 to 2000 mbar.

8. A gas mixture as claimed in claim 1, whose overall pressure is from 800 to 1200 mbar.

9. An open-cell foam article comprising an open cell foam and a gas-tight covering enveloping said foam, which foam article is filled with a gas mixture as claimed in claim 1.

10. A closed-cell foam which contains, within cells of said foam, a gas mixture as claimed in claim 1.

11. A polymer foam having thermal insulation cavities and a gas mixture filling said thermal insulation cavities, said gas mixture comprising a blend of cyclopentane and argon, comprising from 1% by volume of cyclopentane in 99% by volume of argon to 5% by volume of argon in 95% by volume of cyclopentane.

12. A polymer foam as claimed in claim 11, wherein said gas mixture comprises from 10% by volume of cyclopentane in 90% by volume of argon to 75% by volume of cyclopentane in 25% by volume of argon.

13. A polymer foam as claimed in claim 11, wherein said gas mixture comprises from 35% by volume of cyclopentane in 65% by volume of argon to 65% by volume of cyclopentane in 35% by volume of argon.

14. A polymer foam as claimed in claim 11, wherein said gas mixture comprises greater than 40% by volume of said blend and less than 60% by volume of other gases.

15. A polymer foam as claimed in claim 14, wherein said other gases comprise carbon dioxide, air, hydrocarbons having 1 to 8 carbon atoms, noble gases, methyl formate, ethyl formate, acetone or methylal.

16. A polymer foam as claimed in claim 14, wherein said other gases comprise air, carbon dioxide or hydrocarbons having 1 to 8 carbon atoms.

17. A polymer foam as claimed in claim 11, wherein an overall pressure of said gas mixture is from 100 to 2000 mbar.

18. A polymer foam as claimed in claim 11, wherein an overall pressure of said gas mixture is from 800 to 1200 mbar.

* * * * *